Patented Apr. 24, 1951

2,549,994

UNITED STATES PATENT OFFICE 2,549,994

PRODUCTION OF FERROMANGANESE

Marvin J. Udy, Niagara Falls, N. Y.

No Drawing. Application August 11, 1948,
Serial No. 43,771

5 Claims. (Cl. 75—11)

This invention relates to metallurgy and has for an object the provision of an improved method or process for producing metallic manganese. More particularly, the invention contemplates the provision of a method or process which can be employed advantageously and economically to produce high-grade metallic manganese products from various grades of manganese ore, including the usual commercial ores and some ores of too low grade to be treated commercially by means of heretofore customary methods or processes. The invention further contemplates the provision of a method or process which can be employed advantageously and economically to produce high-grade metallic manganese-bearing products from various grades of manganese ore through the use of various grades and types of carbonaceous reducing materials, including the usual commercial carbonaceous reducing materials such, for example, as low-grade coal of too poor quality metallurgically to be employed commercially in heretofore customary methods or processes for recovering manganese from ores. Another object of the invention is to provide an improved method or process for producing various grades of high-carbon ferromanganese and low-carbon ferromanganese from various grades of manganese ore.

In the heretofore customary processes for producing ferromanganese, as, for example, through the use of the blast furnace and the electric furnace in the treatment of manganese ores, losses of manganese by volatilization are very high and such losses combined with losses in the slags prevent the recovery of more than about eighty percent of the manganese. Also, the heretofore customary processes provide no positive or effective means or procedure for the elimination of impurities of the nature of copper, phosphorus, arsenic and lead or for preventing such impurities from entering the final ferromanganese product.

In the process of my invention, I provide for the removal or elimination of impurities such, for example, as copper, phosphorus, arsenic and lead, when present in the ore available for treatment, by utilizing a charge comprising reducible iron oxide and carrying out a fractional reduction to produce a small amount of metallic iron which serves as a collector for the impurities and which may be separated readily from unreduced or non-metallic iron and manganese oxide compounds contained in the charge.

In the preparation of charges in accordance with the invention, iron oxide from extraneous sources may be incorporated in the charges when the manganese ore is deficient in iron oxide required for providing metallic iron in the amount required for elimination of impurities, when necessary, and for providing the required amount of iron to produce ferromanganese having the desired iron-manganese ratio. Metallic iron may be employed also for supplementing the iron contained in the manganese ore.

In the process of my invention, I reduce or limit the losses of manganese through volatilization by sintering the charge materials preliminarily, with or without reduction of a portion at least of the reducible iron or iron and manganese with a suitable reducing agent at a relatively low temperature.

For fluxing the ore to be treated and forming a suitable slag, I form a charge mixture comprising the manganese ore, iron oxide if required, lime in the form of limestone and silica. In forming a charge in accordance with the invention, I prefer to mix intimately the various components, including the ore, slag-forming material and any solid carbonaceous reducing material which may be employed as hereinafter provided. The components may be crushed to any suitable degree of fineness, and any suitable mixing methods and apparatus may be employed. For most effective mixing, I prefer to grind together in a suitable mill the various components of the charge. A charge in which all the materials are finely divided and all particles are small enough to pass through a 4-mesh screen permits effective sintering and effective reduction when reduction is provided for.

I select the components of the charge to provide for the production of a slag having a lime-silica molecular ratio in the range 0.8 to 1.5 molecules of CaO to 1.0 molecules of $SiO_2$. Heating of a charge consisting essentially of manganese ore, iron oxide if required, lime in the form of limestone and silica to a temperature in the range 1250° C. to 1350° C. produces a desirable sintered product. Such a sintering treatment results in decomposition of any manganese dioxide ($MnO_2$) present in the charge with the production of manganese oxide (MnO), calcination of the limestone with the production of calcium oxide (CaO) and with chemical combination of the lime with the manganous oxide and the silica. Fixing of the lime (CaO) in chemical combination with the manganous oxide and silica is very important as it prevents picking up of carbon dioxide from the atmosphere and thus facilitates the production of low-carbon ferromanganese very low in carbon.

If fractional reduction or complete reduction of iron or iron and maganese is to be carried out, a solid reducing agent such as coal or coke may be incorporated in the charge to be subjected to the sintering treatment and sintering may be carried out at a somewhat lower temperature to effect low-temperature reduction of the iron of the charge.

Low-temperature reduction of iron or iron oxide contained in a charge prepared in accordance with the invention may be carried out at a temperature between about 600° C. and the melting point of the metallic iron produced. Preferably, reduction is carried out in the upper portion of the range extending from 600° C. to the melting temperature of the metallic iron produced. A suitable temperature is one just at or just below the fusing temperature of the slag—a temperature, preferably, at which sufficient softening of the charge undergoing treatment to produce a sintering product takes place. Adjustment of the proportions of slag-forming materials present in the charge may be carried out advantageously to provide for effective reduction at temperatures about in the range 1100° C. to 1200° C.

In practicing my invention, I prefer to employ a low-temperature sintering operation and one or more high-temperature furnace operations. The low-temperature operation is carried out at a sintering temperature and the one or more high-temperature operations are carried out at melting temperatures—temperatures at which the charges undergoing treatment are melted or are maintained in the molten state.

In the sintering operation, the charge employed may be free of reducing material or it may contain all or a portion only of the reducing material (preferably solid carbonaceous reducing material) required to reduce all of the reducible iron and manganese contained in the charge, and the operation may be carried out at a temperature and for a period of time sufficient to effect reduction of reducible iron and manganese by means of all or by means of a portion only of the reducing material contained in the charge.

The hot sintering product is introduced into a high-temperature melting furnace wherein melting alone may be accomplished or wherein melting and further reduction of manganese or of iron and manganese may be accomplished. For melting or for melting and reduction, I may employ either a combustion heated furnace of the type, for example, of an open hearth furnace or an electric furnace of the type, for example, of a submerged arc furnace or an open arc furnace or an arc resistance furnace.

For the production of carbon-bearing ferromanganese of controlled carbon content, I may sinter a charge, free of reducing material, introduce the hot sintered product into a submerged arc type or arc resistance type of electric furnace to produce a molten slag product, introduce the molten slag product into an open arc type electric furnace, and add coal or coke to the molten slag in the open arc furnace to reduce the iron and manganese contained in the slag with the production of molten ferromanganese. By suitably controlling the proportions of iron and manganese in the original charge, a ferromanganese product containing 80 percent or any other desired percentage of manganese may be produced, and, by controlling the amount of carbon and the temperature employed, ferromanganese products containing various amounts of carbon may be produced. Products containing 0.10 percent, 1.5 percent and 7.0 percent, for example, may be produced as desired.

The furnace employed for the high-temperature reduction may be much larger than the furnace employed for melting. Large quantities of ferromanganese can be held in the furnace to refine and produce a constant composition alloy instead of the variable composition grade of alloy produced by other methods.

If desired, the melting furnace may be omitted in the foregoing operation, and the hot sinter may be charged directly into an open arc electric furnace wherein reduction may be carried out by the addition of coal or coke.

For treating ore containing relatively large amounts of impurities such, for example, as copper, phosphorus, lead and arsenic, I may carry out fractional reduction of iron in the sintering operation, melt the sintered product to form a metallic iron product containing the impurities and a slag product containing the remainder of the iron and the manganese, and I may subject the resulting molten slag product to a reducing treatment in a suitable electric or other furnace to form a ferromanganese product substantially free of impurities. If desired, fractional reduction of iron to provide metallic iron for the collection of impurities may be carried out in a high-temperature operation following or subsequent to the sintering operation. The molten slag, after separation of the metallic iron product containing the impurities may be subjected to a reducing treatment to produce a ferromanganese product substantially free of impurities.

Since ferromanganese melts at a rather low temperature (1225° C. approximately), it is not necessary to use the electric furnace but a fuel fired furnace may be used in conjunction with a rotary kiln for heating the charge up to 1100° C. to 1200° C. Operating in this manner, I feed to the sintering kiln manganese ore, iron ore or scrap and lime and silica in the right ratio to produce a slag containing lime and silica in about the ratio 1.0 to 1.5 molecules of $CaO$ to 1.0 molecule of $SiO_2$ and sufficient coal to reduce the iron and part or all of the manganese. If there are impurities to be removed, I prefer to reduce the iron only to the metallic state and to reduce the manganese oxides to MnO. In this way, the copper, phosphorus and other impurities may be collected in a small amount of iron. When these impurities must be removed, the second furnace is used as a collecting furnace for the impure iron and the high manganese slag is tapped into a third furnace, where it is reduced with coal or coke to produce ferro-manganese of 80% Mn and 1.5% to 7% C.

If there are no impurities, or if the impurities are low, the third furnace is not used and the required iron may all be reduced in the rotary kiln and the manganese to a lower oxide and combined with the lime and silica.

In the case of the high silica ore, whether an electric furnace or kiln is used to bring the charge up to 1200° C. there is practically no reduction of silica and in the second or third furnace, as the case may be, the temperature is so controlled that the reduction of silica does not take place. Thus it is possible to make use of high silica ores, containing 15% or more silica and produce an 80% ferromanganese low in silicon meeting successfully the specifications of 1% Si or even lower, in the ferromanganese.

If it is desired to make low carbon ferromanganese, I use the rotary kiln for heating to 1200° C. and I use oil or gas or coal firing without the addition of coal to the charge for reduction. The product from the kiln is thus free from carbon as such and as $CO_2$. The product is then brought up to temperature in an electric or open hearth type furnace to about 1225° C. or thereabouts (1300° C. preferred) and the manganese is reduced with 75% or 80% ferrosilicon or silicon metal to produce low carbon ferromanganese containing 80% Mn .06 to .10 C. and .17 Si.

The cost of heating to 1200° C. with fuel is cheaper than using an electric furnace for this operation and it also calcines the lime and removes any carbon as such and as $CO_2$. The silicon reduction produces a very low carbon ferromanganese.

The process may be carried out in electric furnaces or in fuel fired furnaces, but the electric furnace is much preferred.

If it is desired to make silico manganese containing 20% Si, silicon metal is used for reduction.

This process becomes available for the economical utilization of high iron manganese ores. Thus in the rotary kiln or other sintering apparatus, only enough coal would be used to reduce the iron ore to the metal and to reduce the $MnO_2$ to MnO. The product of the sintering operation is heated to a melting temperature in a suitable furnace. There is thus produced a molten slag product containing substantially all or a large proportion of the manganese as manganous oxide and a molten iron product containing substantially all or a large proportion of the iron of the ore. In the melting furnace, any manganese in the molten iron is carefully reoxidized into the slag. The slag from such an operation is then reduced with carbon in coal or silicon metal in the second furnace to produce ferromanganese of high or low carbon grade whichever is desired. Large supplies of high iron manganese ores are thus made available for use. Ores of a type containing 30% manganese and about 30% iron are particularly economical when treated by this process, both pig iron and 80% ferromanganese being produced.

Low-temperature reduction or preliminary melting alone or coupled with low-temperature reduction provides a preheated charge which accelerates reduction of the manganese at a relatively low temperature and reduces the opportunity for volatilization of manganese as compared with the opportunities in heretofore customary processes in which the period of heating to effect reduction is prolonged with the result that elemental manganese is present to some extent throughout. In the process of the invention, elemental or metallic manganese is maintained at temperatures of high vapor pressures only briefly during a melting period or during a reducing period in which the manganese is not subjected to reducing influences capable of producing molten metallic manganese until the entire charge has been heated to a temperature at which reduction will proceed rapidly.

Due to the fact that volatilization losses are reduced by this method the actual power consumption per ton of alloy is less than by the single stage reduction. The first or melting furnace doing practically no reduction results in very little volatilization loss, and the second furnace is of such a type that the power input can be regulated to control the temperature volatilization losses. The slag composition aids in this control. A slag having a ratio of .8 to 1 and up to 1.5 to 1 CaO to $SiO_2$ is preferred for insuring low volatilization losses. Higher ratios may be employed with a sacrifice of efficiency of recovery through volatilization of manganese because of higher temperatures required.

When reduction is to be effected in the sintering operation, a reducing environment may be created in any suitable manner through the use of any suitable carbonaceous reducing material, and the reducing environment may be of a character such as to produce any suitable degrees of reduction of the iron and the manganese. In a preferred process of the invention, the reducing environment is created by the incorporation in the charge to be sintered of low-grade coal in amount in excess of that required to reduce all of the iron of the charge to the metallic state. If desired, the low-grade coal may be incorporated in the charge in amount sufficient to effect reduction of all or substantially all of the iron and the manganese of the ore. The temperature and time of treatment employed in the sintering operation may be controlled to effect reaction of all or only a portion of the carbonaceous material of the coal with the iron oxide and manganese oxide. Preferably, the sintering operation is controlled as to time and temperature to effect decomposition of the low-grade coal with elimination of all or substantially all of the volatile matter and the conversion of any excess coal, over and above that caused to react with the reducible iron and manganese oxides through the controls employed to a solid product consisting essentially of fixed carbon and widely dispersed throughout the charge in intimate association with the other charge materials.

Any suitable apparatus may be employed in carrying out a sintering operation in accordance with the invention.

I claim:

1. The method of producing ferromanganese which comprises subjecting a charge comprising iron oxide, manganese dioxide, lime in the form of limestone and silica to a sintering treatment under reducing conditions to effect calcination of the limestone with the production of calcium oxide, partial reduction of the iron oxide and manganese dioxide, chemical combination of the calcium oxide with manganese oxide and silica and the production of a high-temperature sintered product, melting the high-temperature sintered product to form a molten bath comprising a slag layer containing unreduced manganese oxide and iron oxide and a metal layer containing reduced iron and impurities such as lead, copper, arsenic and the like if present in the original charge, separating the molten metal and the molten slag, subjecting the molten slag to a reducing treatment in an open arc electric furnace and forming a molten bath comprising molten slag and molten ferromanganese, and separating the molten slag and the molten ferromanganese.

2. The method of producing ferromanganese which comprises subjecting a charge comprising iron oxide, manganese oxide, lime and silica to a sintering treatment at a temperature in the range 1100° C. to 1350° C. under reducing conditions and producing a high-temperature sintered product containing a portion of the iron of the iron oxide in the metallic state, subjecting the high-temperature sintered product to a reducing treatment in an open arc electric furnace and forming a molten bath comprising molten slag and molten ferromanganese, and separating the molten slag and the molten ferromanganese.

3. The method of producing ferromanganese which comprises subjecting a charge comprising iron oxide, manganese dioxide, lime in the form of limestone and silica to a sintering treatment at a temperature in the range 1250° C. to 1350° C. under reducing conditions to effect calcination of the limestone with the production of calcium oxide, partial reduction of the iron oxide and manganese dioxide, chemical combination of the calcium oxide with manganese oxide and silica and the production of a high temperature sintered product, subjecting the high-temperature sintered product to a reducing treatment in an open arc electric furnace and forming a molten bath comprising molten slag and molten ferromanganese, and separating the molten slag and the molten ferromanganese.

4. The method of producing ferromanganese which comprises subjecting a charge comprising iron oxide, manganese oxide, lime and silica to a sintering treatment at a temperature in the range 1100° C. to 1350° C. under reducing conditions and producing a high-temperature sintered product containing a portion of the iron of the iron oxide in the metallic state, subjecting the high-temperature sintered product to a reducing treatment in an open arc electric furnace and forming a molten bath comprising molten slag and molten ferromanganese, and separating the molten slag and the molten ferromanganese, lime and silica being employed in the charge in a molecular ratio in the range 0.8 to 1.5 molecules of CaO to 1.0 molecule of $SiO_2$.

5. The method of producing ferromanganese which comprises subjecting a charge comprising iron oxide, manganese dioxide, lime in the form of limestone and silica to a sintering treatment at a temperature in the range 1250° C. to 1350° C. under reducing conditions to effect calcination of the limestone with the production of calcium oxide, partial reduction of the iron oxide and manganese dioxide, chemical combination of the calcium oxide with manganese oxide and silica and the production of a high temperature sintered product, subjecting the high-temperature sintered product to a reducing treatment in an open arc electric furnace and forming a molten bath comprising molten slag and molten ferromanganese, and separating the molten slag and the molten ferromanganese, lime and silica being employed in the charge in a molecular ratio in the range 0.8 to 1.5 molecules of CaO to 1.0 molecule of $SiO_2$.

MARVIN J. UDY.

REFERENCES CITED

The following references are of record in the file of this patent:

UNITED STATES PATENTS

| Number | Name | Date |
|---|---|---|
| 1,028,070 | Hiorth | May 28, 1912 |
| 1,792,532 | Flodin | Feb. 17, 1931 |
| 2,026,683 | Johannsen | Jan. 7, 1936 |
| 2,128,615 | Krus et al. | Aug. 30, 1938 |